United States Patent
Zhang et al.

(10) Patent No.: US 10,548,151 B2
(45) Date of Patent: Jan. 28, 2020

(54) DEAFNESS REDUCTION IN PREAMBLE DETECTION FOR MEDIUM SHARING

(71) Applicant: QUALCOMM Incorporated, San Diego, CA (US)

(72) Inventors: Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/693,654

(22) Filed: Sep. 1, 2017

(65) Prior Publication Data

US 2018/0270842 A1    Sep. 20, 2018

Related U.S. Application Data

(60) Provisional application No. 62/472,947, filed on Mar. 17, 2017.

(51) Int. Cl.
*H04W 72/12* (2009.01)
*H04W 72/04* (2009.01)

(52) U.S. Cl.
CPC ........... *H04W 72/12* (2013.01); *H04W 72/04* (2013.01)

(58) Field of Classification Search
CPC . H04W 72/12; H04W 74/0833; H04W 72/04; H04L 5/0048; H04L 27/0006
See application file for complete search history.

(56) References Cited

U.S. PATENT DOCUMENTS

2003/0096631 A1*  5/2003  Kayama ................ H04W 52/50
                                                                    455/522
2016/0183276 A1*  6/2016  Marinier ............... H04W 72/02
                                                                    370/329

* cited by examiner

*Primary Examiner* — Jackie Zuniga Abad
(74) *Attorney, Agent, or Firm* — Haynes and Boone, LLP

(57) ABSTRACT

Wireless communications systems and methods related to asynchronous medium sharing are provided. A first wireless communication device transmits a first channel reservation message to reserve a transmission opportunity (TXOP) in a shared spectrum. The first wireless communication device transmits a second channel reservation message during the TXOP. The first wireless communication device communicates, with a second wireless communication device, data over the shared spectrum during the TXOP.

30 Claims, 9 Drawing Sheets

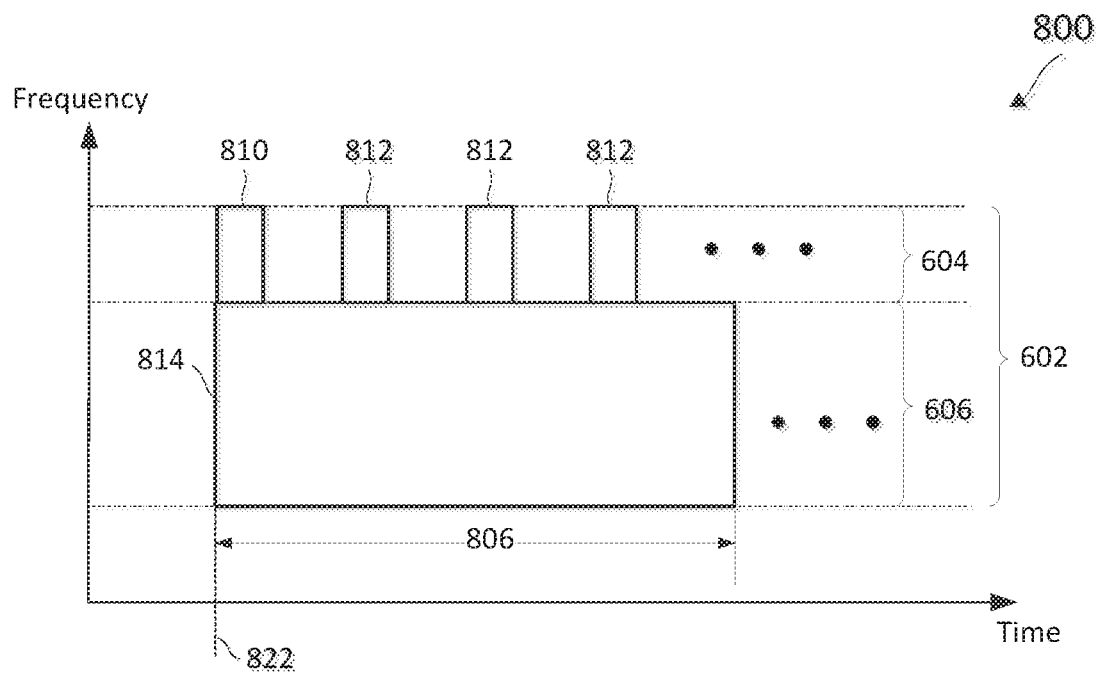
FIG. 8A
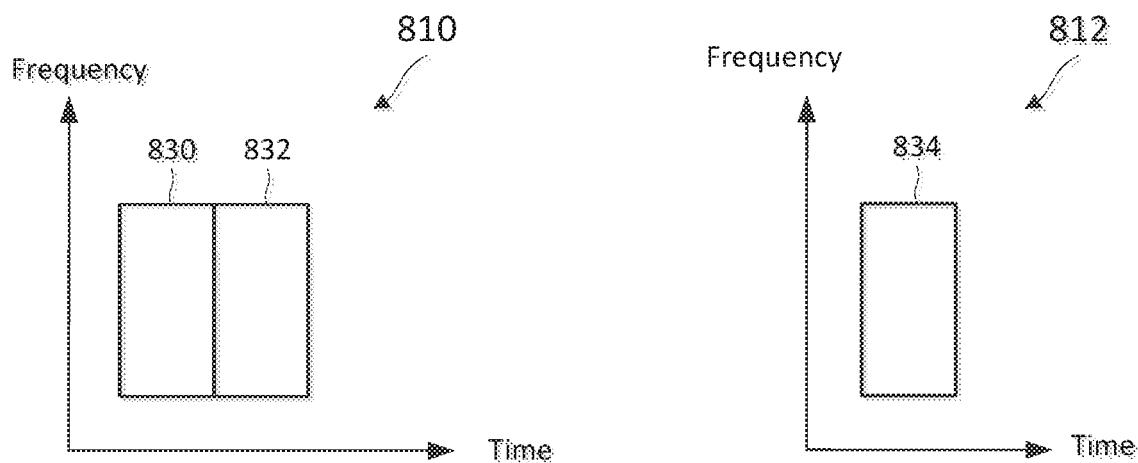
FIG. 8B
FIG. 8C

DEAFNESS REDUCTION IN PREAMBLE DETECTION FOR MEDIUM SHARING

CROSS REFERENCE TO RELATED APPLICATIONS

The present application claims priority to and the benefit of the U.S. Provisional Patent Application No. 62/472,947, filed Mar. 17, 2017, which is hereby incorporated by reference in its entirety as if fully set forth below and for all applicable purposes.

TECHNICAL FIELD

This application relates to wireless communication systems, and more particularly to addressing and/or solving deafness scenarios in preamble detection for asynchronous medium sharing.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple wireless nodes. Use of the available band spectrum may then be subject to a contention procedure that may involve the use of a medium sensing procedure. For example, to avoid interference between different nodes, the wireless communications system may employ medium sensing procedures, such as listen-before-talk (LBT), to ensure a particular channel is clear before transmitting a message. For example, a node may transmit a preamble to reserve the medium prior to transmitting data over the medium. Other nodes may listen to the medium and yield access when detecting the preamble.

Medium sensing can be performed synchronously or asynchronously among nodes. For synchronous medium sensing, transmission opportunities (TXOPs) in a medium have predefined time periods and nodes may transmit preambles at predefined time periods within the TXOPs. Thus, missed preamble detection or deafness due to TXOP misalignment may not be an issue in synchronous medium sensing. However, tor asynchronous medium sensing, nodes may acquire a medium asynchronously. For example, a node may start a TXOP at any time and transmit a preamble at the beginning of the TXOP to reserve the medium. Thus, a monitoring node may be performing preamble detection while another node had already started a TXOP and transmitting non-preamble data. As such, missed preamble detection is likely to occur in asynchronous medium sensing. While synchronous medium sensing may have less missed preamble detection than asynchronous medium sensing, synchronous medium sensing requires all nodes to be synchronized in time and may require a coordinator (e.g., a spectrum access system (SAS)), backhaul, and/or over-the-air (OTA) messages for coordination. Asynchronous medium sensing may be less complex for implementation and deployment compared to synchronous medium sensing. Accordingly, solving the deafness problem in asynchronous medium sensing may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first wireless communication device, a first channel reservation message to reserve a transmission opportunity (TXOP) in a shared spectrum; transmitting, by the first wireless communication device, a second channel reservation message during the TXOP; and communicating, by the first wireless communication device with a second wireless communication device, data over the shared spectrum during the TXOP.

In an additional aspect of the disclosure, an apparatus includes a transceiver configured to transmit a first channel reservation message to reserve a transmission opportunity (TXOP) in a shared spectrum; transmit a second channel reservation message during the TXOP; and communicate, with a second wireless communication device, data over the shared spectrum during the TXOP.

In an additional aspect of the disclosure, a computer-readable medium having program code recorded thereon, the program code includes code for causing a first wireless communication device to transmit a first channel reservation message to reserve a transmission opportunity (TXOP) in a shared spectrum; code for causing the first wireless communication device to transmit a second channel reservation message during the TXOP; and code for causing the first wireless communication device to communicate, with a second wireless communication device, data over the shared spectrum during the TXOP.

In an additional aspect of the disclosure, an apparatus includes means for transmitting a first channel reservation message to reserve a transmission opportunity (TXOP) in a shared spectrum; means for transmitting a second channel reservation message during the TXOP; and means for communicating, with a second wireless communication device, data over the shared spectrum during the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8A illustrates a channel reservation scheme that reduces deafness in preamble detection for asynchronous medium sharing according to embodiments of the present disclosure.

FIG. 8B illustrates a detailed channel reservation message according to embodiments of the present disclosure.

FIG. 8C illustrates a shortened channel reservation message according to embodiments of the present disclosure.

DETAILED DESCRIPTION

Figure 1:
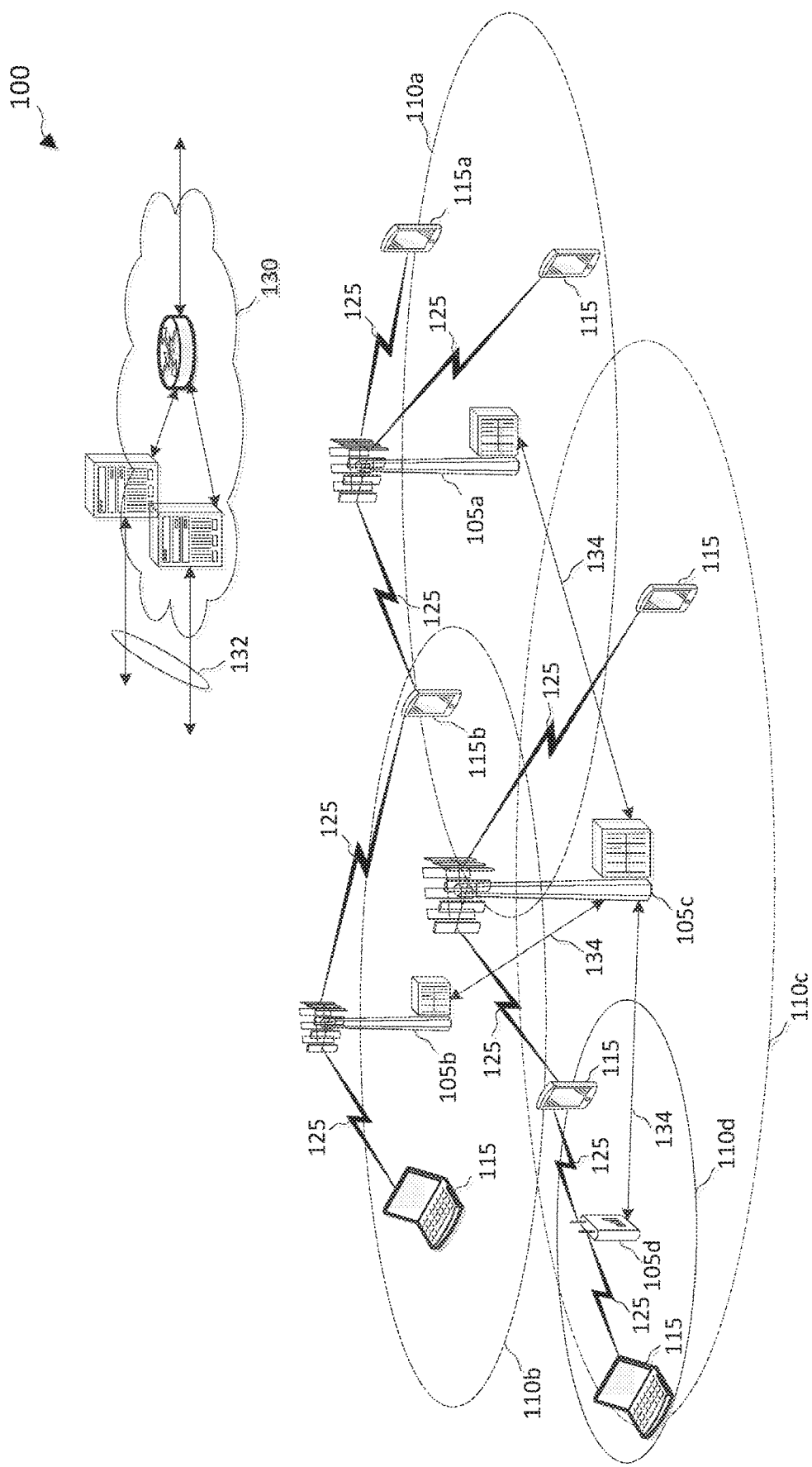
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for improving asynchronous medium-sharing by reducing deafness in preamble detection. In asynchronous medium sharing, TXOPs of different nodes may start at different time and each node may perform preamble detection at any time, for example, at the end of a data transmissions. In the disclosed embodiments, a transmitter may transmit multiple channel reservation messages over a duration of a TXOP instead of a single channel reservation message at the beginning of the TXOP. A channel reservation message may include a preamble and additional reservation information (e.g., a reservation duration of the TXOP). The transmitter may distribute the transmissions of the channel reservation messages uniformly over the duration of a TXOP or at selected time during the TXOP. For example, a transmitter may being a TXOP during another node's TXOP. The transmitter may obtain information about the other node's TXOP and transmit at least one channel reservation message at the end of the other node's TXOP to allow the other node to detect channel reservation message and yield access. In one embodiment, a transmitter may transmit different versions of channel reservation messages over a duration of a TXOP. For example, a transmitter may transmit a full or detailed version of a channel reservation message at the beginning of the TXOP followed by one or more shortened version of the channel reservation message. In one embodiment, a transmitter may simultaneously transmit channel reservation messages and data during the TXOP using different frequency bands or different frequency resources.

Aspects of the present disclosure can provide several benefits. For example, the repeated transmissions of preambles or channel reservation messages can increase the probabilities of preamble detection or reduce the probabilities of missed preamble detection. The use of a dedicated frequency band for channel reservation message transmissions allows for continuous channel reservation message transmissions in concurrent with data transmissions and thus allowing other nodes to monitor for preambles any time. The use of different versions of channel reservation messages can reduce channel reservation processing overheads. The retransmissions of preambles or channel reservation messages at selected transmission time can further improve preamble detection performance and thus improving asynchronous medium sharing efficiency.

FIG. 1 illustrates a wireless communication network 100 according to embodiments of the present disclosure. The network 100 includes BSs 105, UEs 115, and a core network 130. The network 100 may be a cellular network or a non-cellular wireless network. For example, the network 100 may be a LTE network, a LTE-A network, a millimeter wave (mmW) network, a new radio (NR) network, a 5G network, or any other successor network to LTE. A BS 105 may be a station that communicates with the UEs 115 and may also be referred to as a base transceiver station, a node B, an Evolved Node B (eNodeB) or a next Generation Node B (gNB), an access point, and the like.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the network 100 operates over a shared medium or a shared spectrum. The shared spectrum may be unlicensed or partially licensed to one or more network operators. The BSs 105 and the UEs 115 may communicate using asynchronous medium sensing mechanisms as described in greater detail herein.

Figure 2:
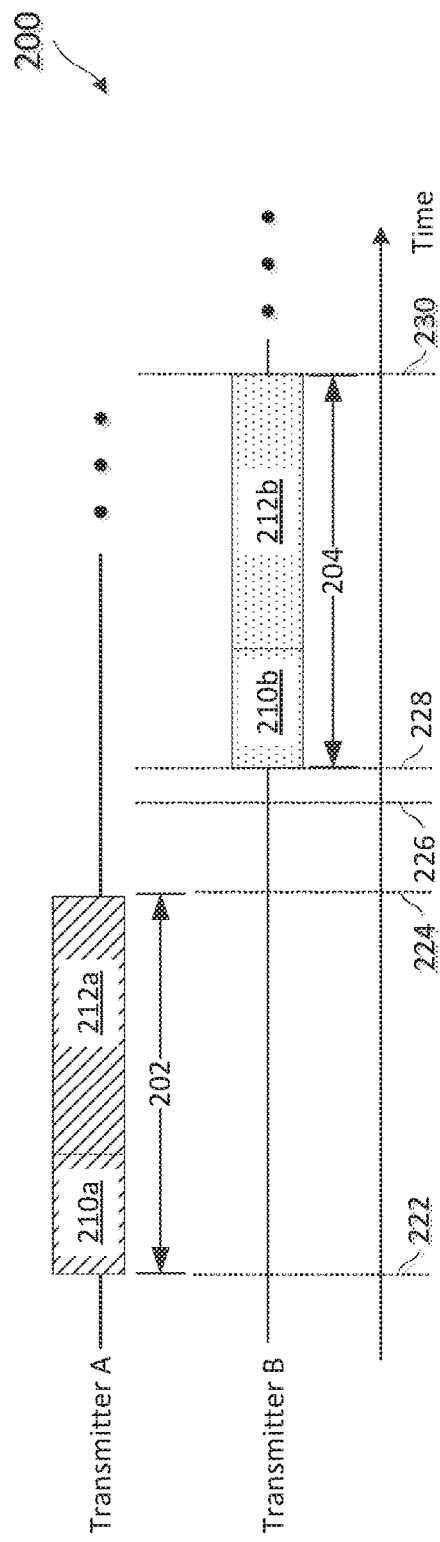
FIG. 2 illustrates an example preamble detection scenario in asynchronous medium sharing according to embodiments of the present disclosure.

FIG. 2 illustrates an example preamble detection scenario 200 in asynchronous medium sharing according to embodiments of the present disclosure. In FIG. 2, the x-axis represents time in some constant units. The scenario 200 illustrates preamble detection timing in a network such as the network 100 using asynchronous medium-sensing. In the scenario 200, a transmitter A (e.g., a BS 105 or a UE 115) of one transmit-receive pair and a transmitter B (e.g., a BS 105 or a UE 115) of another transmit-receive pair share the same medium for communications. The transmitter A and the transmitter B acquire the medium asynchronously. For example, the transmitter A acquires a TXOP 202 beginning at a time 222 and ends at a time 224, while the transmitter B acquires a TXOP 204 beginning at a time 228 and ends at a time 230.

As shown, the transmitter A transmits a preamble 210a prior to transmitting data 212a in the TXOP 202. The preamble 210a functions as a channel or medium reservation indicating that the medium is in use by the transmitter A. The transmitter B may detect the preamble 210a. Upon detecting the preamble 210a, the transmitter B yields medium access to the transmitter A. The transmitter B may perform random backoff to backoff or delay the transmitter B's transmission by a random amount of time. After the random backoff period has expired, for example, at a time 226, the transmitter B may repeat preamble. The transmitter B may determine that the medium is clear or available and begins the TXOP 204 at the time 228. The transmitter B transmits a preamble 210b prior to transmitting data 212b in the TXOP 204.

Each preamble 210 may include a predetermined sequence and/or additional channel reservation information, such as a duration of the reservation (e.g., the TXOPs 202 and 204). A transmitter (e.g., the transmitter A or the transmitter B) may listen to the medium and perform preamble detection. When the medium is clear or unoccupied (e.g. no preamble detected), the transmitter may proceed to access the medium (e.g., to transmit a preamble 210 and data 212). Otherwise, the transmitter may refrain from accessing the medium. Since the transmitter B detected the transmitter A's preamble 210a (e.g., no missed preamble detection), there is no collision in the scenario 200.

Missed preamble detections may occur when the channel signal-to-noise ratio (SNR) is low, for example, due to collision. However, missed preamble detections may also occur when the channel SNR is high due to asynchronous operations between transmitters when using asynchronous medium sharing.

Figure 3:
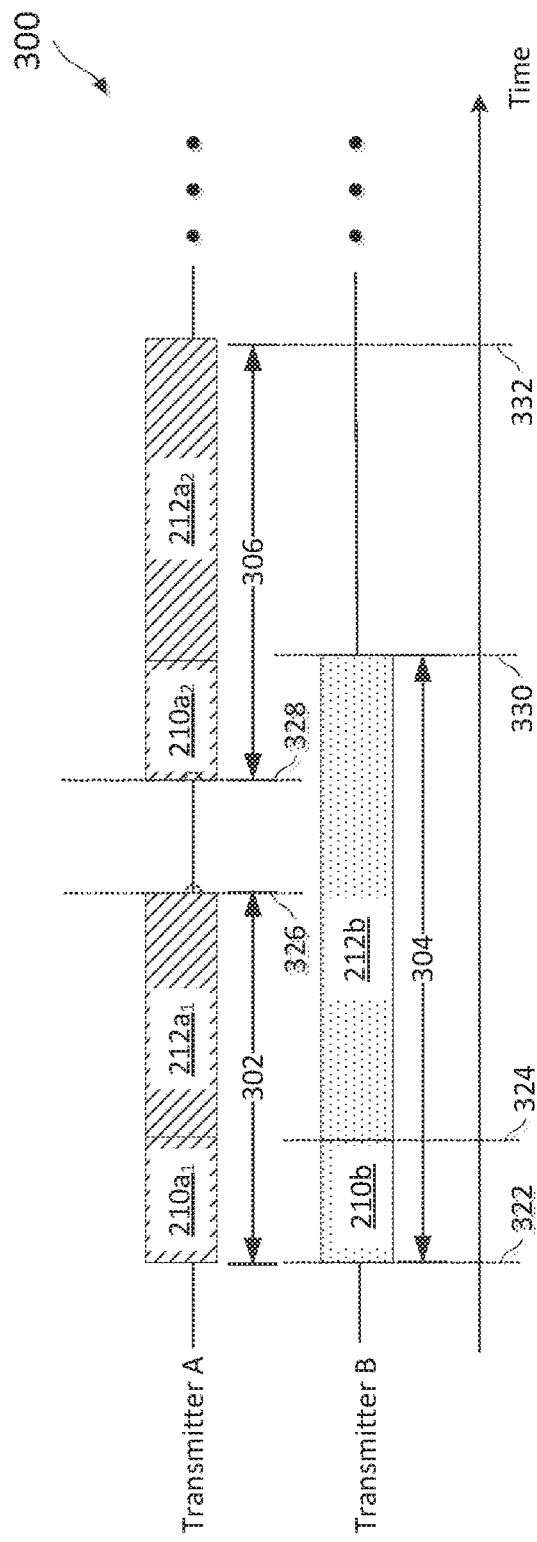
FIG. 3 illustrates an example missed preamble detection scenario in asynchronous medium sharing according to embodiments of the present disclosure.

FIG. 3 illustrates an example missed preamble detection scenario 300 in asynchronous medium sharing according to embodiments of the present disclosure. In FIG. 3, the x-axis represents time in some constant units. The scenario 300 illustrates the effects of missed preamble detection propagating in a network such as the network 100 when using asynchronous medium sharing. Similar to the scenario 200, a transmitter A (e.g., a BS 105 or a UE 115) of one transmit-receive pair and a transmitter B (e.g., a BS 105 or a UE 115) of another transmit-receive pair share the same medium for communications.

In the scenario 300, both the transmitter A and the transmitter B may previously detected that the medium is busy and both may perform random backoff. For example, the transmitter A and the transmitter B obtained the same random backoff duration. Thus, both the transmitter A and the transmitter B may begin transmissions at the same time. As shown, the transmitter A begins a TXOP 302 at a time 322 and the transmitter B begins a TXOP 304 at the same time 322. The transmitter A transmits a preamble $210a_1$, followed by data $212a_1$ in the TXOP 302. Similarly, the transmitter B transmits a preamble 210b, followed by data 212b in the TXOP 304. However, the TXOP 302 and the TXOP 304 end at different time. For example, the TXOP 302 ends at a time 326, while the TXOP 304 ends at a later time 330.

After completing the transmission of the data 212, the transmitter A may perform preamble detection, for example, at a time 326. Since the preamble detection window (e.g., between the time 322 and 324) for the preamble 210b of the transmitter B has passed, the transmitter A may not detect any preamble when using energy detection and may incorrectly determine that the medium is clear or available. Thus, the transmitter A may begin another TXOP 306 at a time 328. The transmitter A may proceed to transmit a preamble $210a_2$ and data $212a_2$ during the TXOP 306.

As can be seen, the missed preamble detection of the transmitter A is due to the transmitter A and transmitter B starting TXOPs asynchronously. The asynchronous operations may continue and cause subsequent missed preamble detections. For example, the transmitter B may perform preamble detection after completing the transmission of the data 212b at the time 330 while the transmitter A is transmitting the non-preamble data 212b. Thus, the transmitter B may incorrectly determine that the medium is available when using energy detection and starts another TXOP prior to the end (e.g., at the time 332) of the transmitter A's TXOP 306. Thus, the effects of missed preamble detection can propagate when multiple transmitters are competing for the medium.

Figure 4:
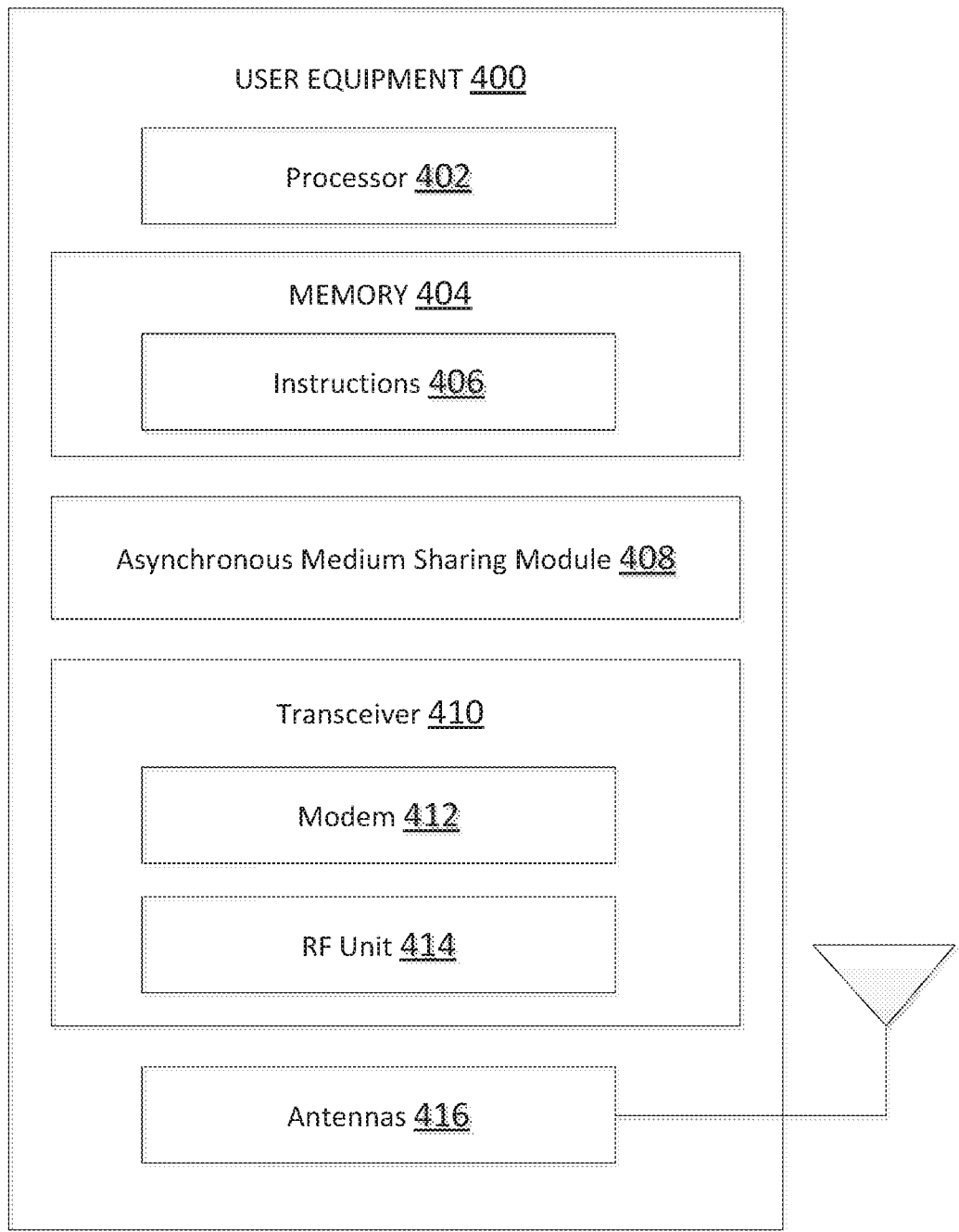
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 as discussed above. As shown, the UE 400 may include a processor 402, a memory 404, an asynchronous medium sharing module 408, a transceiver 410 including a modem subsystem 412 and a radio frequency (RF) unit 414, and an antenna 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The asynchronous medium sharing module 408 may be implemented via hardware, software, or combinations thereof. For example, the asynchronous medium sharing module 408 may be implemented as a processor, circuit, and/or instructions 406 stored in the memory 404 and executed by the processor 402. The asynchronous medium sharing module 408 may be used for various aspects of the present disclosure. For example, the asynchronous medium sharing module 408 is configured to perform medium sensing, reserve time periods for communication, transmit repeated channel reservations during a TXOP to reduce the probabilities of missed preamble detection, determining channel reservation versions or contents or and transmission timing, as described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the asynchronous medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of channel reservation signals according to embodiments of the present disclosure. The antenna 416 may further receive data messages transmitted from other devices. This may include, for example, reception of channel reservation signals according to embodiments of the present disclosure. The antenna 416 may provide the received data messages for processing and/or demodulation at the transceiver 410. Although FIG. 4 illustrates antenna 416 as a single antenna, antenna 416 may include multiple antennas of similar or different designs in order to sustain multiple transmission links. The RF unit 414 may configure the antenna 416.

Figure 5:
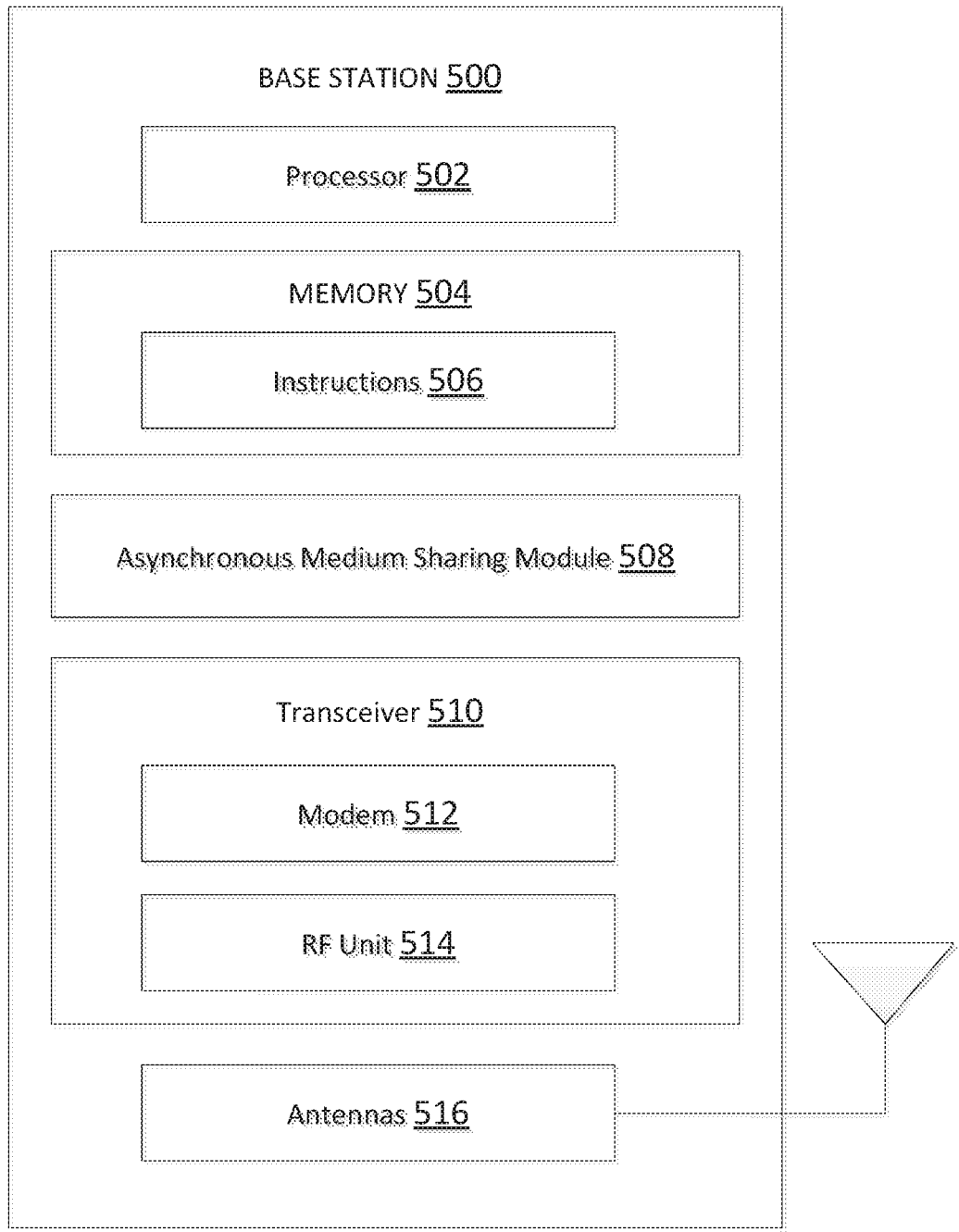
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above. A shown, the BS 500 may include a processor 502, a memory 504, an asynchronous medium sharing module 508, a transceiver 510 including a modem subsystem 512 and a RF unit 514, and an antenna 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristorbased arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The asynchronous medium sharing module 508 may be implemented via hardware, software, or combinations thereof. For example, the asynchronous medium sharing module 508 may be implemented as a processor, circuit, and/or instructions 506 stored in the memory 504 and executed by the processor 502. The asynchronous medium sharing module 508 may be used for various aspects of the present disclosure. For example, the asynchronous medium sharing module 408 is configured to perform medium sensing, reserve time periods for communication, transmit repeated channel reservations during a TXOP to reduce the probabilities of missed preamble detection, determining channel reservation versions or contents or and transmission timing, as described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of information to complete attachment to a network and communication with a camped UE 115 according to embodiments of the present disclosure. The antenna 516 may further receive data messages transmitted from other devices and provide the received data messages for processing and/or demodulation at the transceiver 510. Although FIG. 5 illustrates antenna 516 as a single antenna, antenna 516 may include multiple antennas of similar or different designs in order to sustain multiple transmission links.

Figure 6:
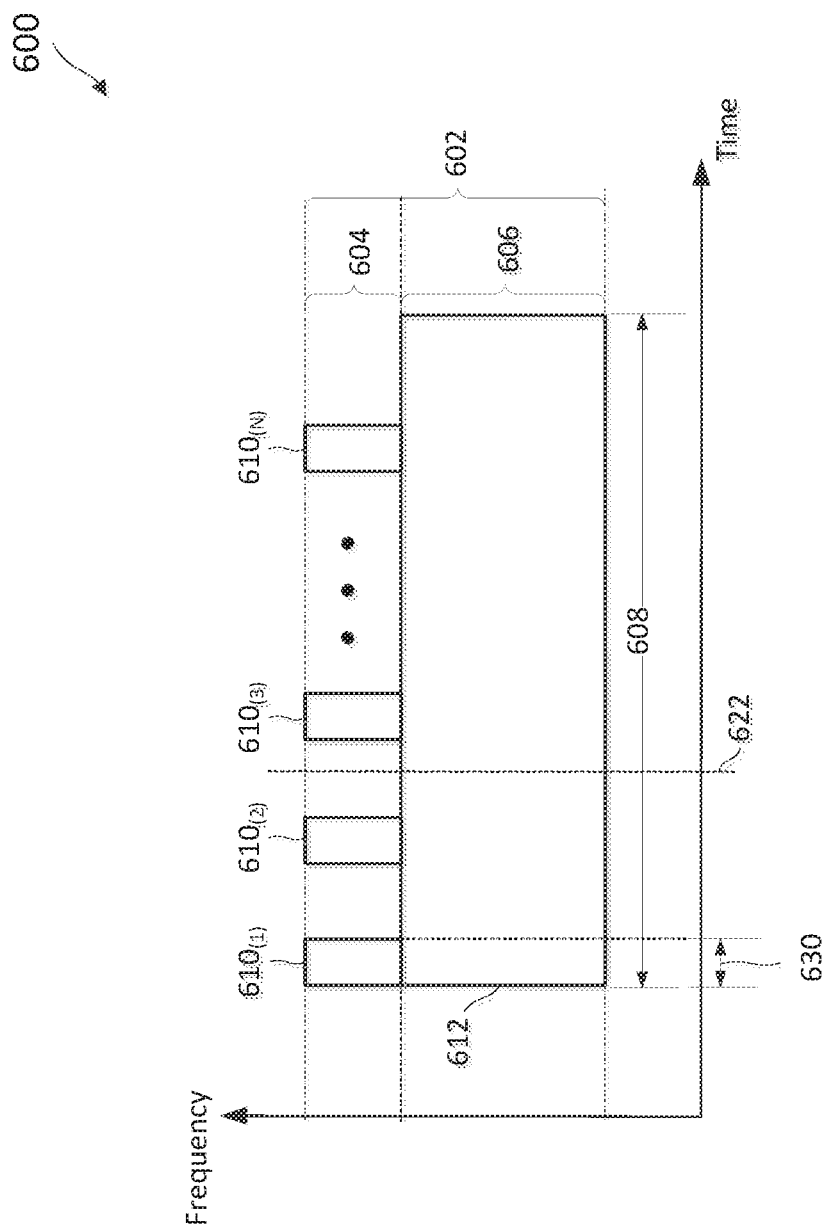
FIG. 6 illustrates a channel reservation scheme that reduces deafness in preamble detection for asynchronous medium sharing according to embodiments of the present disclosure.

FIGS. 6-9 illustrate various improved channel reservation mechanisms that can reduce deafness in preamble detection when applying asynchronous medium sharing. In FIGS. 6-9, the x-axis represents time in some constant units and the y-axis represents frequency in some constant units. FIG. 6 illustrates a channel reservation scheme 600 that reduces preamble detection for asynchronous medium sharing according to embodiments of the present disclosure. The scheme 600 is employed by transmitters such as the BSs 105 and UEs 115 to communicate over a shared spectrum 602 based on asynchronous medium sharing. In the scheme 600, a transmitter may transmit multiple channel reservation messages 610 distributed over a duration of a TXOP 608 while transmitting data 612. Each channel reservation message 610 may include a preamble or a predetermined sequence and additional reservation information (e.g., a reservation duration, an intended receiving node or a destination node for the data 612, and/or a transmission beam direction).

In an embodiment, the shared spectrum 602 includes channel reservation transmission frequency resources 604 and data transmission frequency resources 606. The frequency resources 604 may be less than about 5 percent (%) of the shared spectrum 602 when the channel reservation signal is transmitted. In an embodiment, the frequency resources 604 may be dedicated resources for channel reservation transmission. The transmitter may transmit the channel reservation messages 610 using the frequency resources 604 while transmitting the data 612 using the frequency resources 606. While the frequency resources 604 are illustrated as a dedicated narrow frequency band in the shared spectrum 602, the frequency resources 604 can be alternatively configured to achieve similar functionalities.

The repeating transmissions of the channel reservation messages 610 over the duration of the TXOP 608 can increase preamble detection probabilities. For example, when the transmitter transmits N number of channel reservation messages 610 in the TXOP 608, the missed preamble detection probabilities can be reduced by about N times. The repeated transmissions also enable another node to begin preamble detection at a time 622 after the preamble detection window 630 of the first channel reservation message $610_{(1)}$ has passed and still be able to detect at least one of the remaining channel reservation messages $610_{(1)}$ to $610_{(N)}$.

In one embodiment, the transmitter may transmit the channel reservation messages 610 uniformly distributed over the duration of the TXOP 608. In another embodiment, the transmitter may transmit the repeated channel reservation messages 610 at selected transmission time. In some embodiments, the transmitter may determine whether to transmit the repeated channel reservation messages 610 uniformly over time or at selected transmission time based on a previous channel reservation detection. For example, the transmitter may transmit the repeated channel reservation messages 610 uniformly over the duration of the TXOP 608 when the transmitter did not detect any previous channel reservation from another transmit node. Alternatively, the transmitter may transmit the repeated channel reservation messages 610 at selected transmission time when the transmitter detected a previous channel reservation from another transmit node. The selected transmission time, for example, can be chosen to allow the other node to better detect preamble when the other node has completed its TXOP, as described in greater detail herein. In some embodiments, the transmitter may transmit the channel reservation messages 610 at a boosted power level to increase coverage.

Figure 7A:
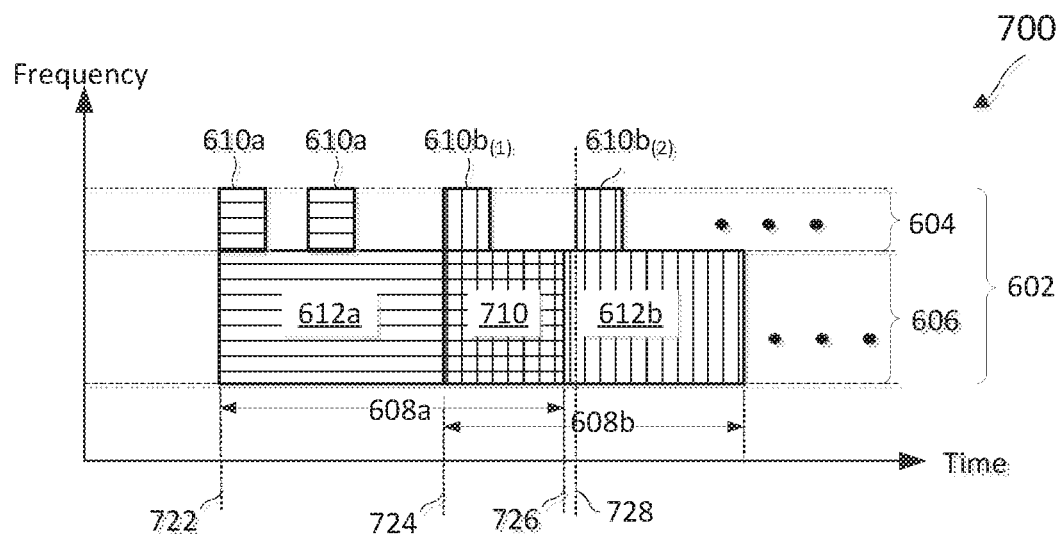
FIG. 7A illustrates an asynchronous medium sharing scenario according to embodiments of the present disclosure.
Figure 7B:
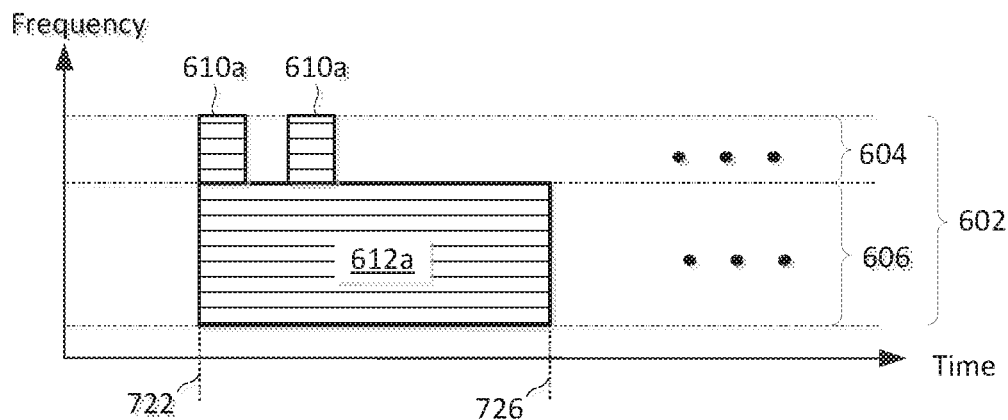
FIG. 7B illustrates channel reservation and data transmissions by a transmitter in an asynchronous medium sharing scenario according to embodiments of the present disclosure.
Figure 7C:
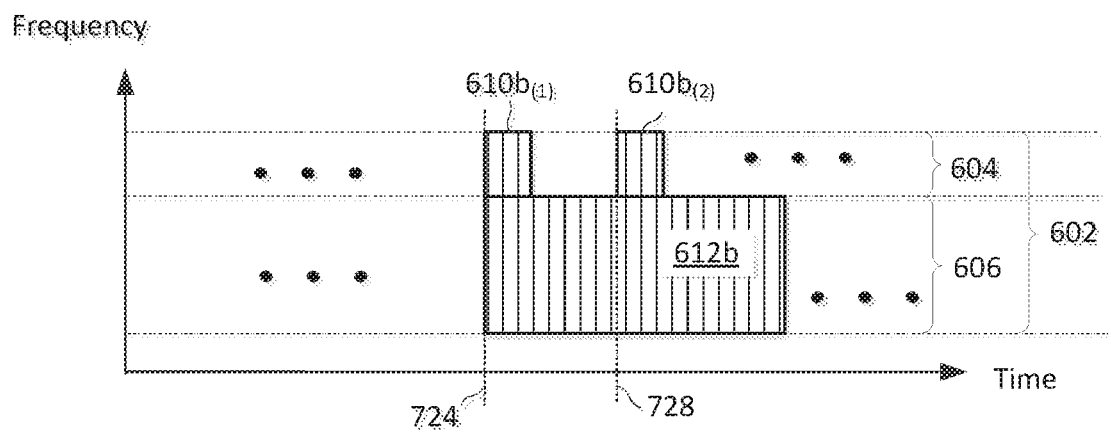
FIG. 7C illustrates channel reservation and data transmissions by a transmitter in an asynchronous medium sharing scenario according to embodiments of the present disclosure.

FIG. 7A illustrate an asynchronous medium sharing scenario 700 according to embodiments of the present disclosure. The scenario 700 illustrates a transmitter A (e.g., a BS 105 or a UE 115) of a transmitter-receiver pair and a transmitter B (e.g., a BS 105 or a UE 115) of another transmitter-receiver pair employing the channel reservation scheme 600 for asynchronous medium sharing. FIGS. 7B and 7C provide separate views of the transmissions of the transmitter A and the transmitter B in the scenario 700. FIG.

7B illustrates channel reservation and data transmissions by the transmitter A in the asynchronous medium sharing scenario 700 according to embodiments of the present disclosure. FIG. 7C illustrates channel reservation and data transmissions by the transmitter B in the asynchronous medium sharing scenario 700 according to embodiments of the present disclosure.

In the scenario 700, the transmitter A acquires a TXOP 608a in the shared spectrum 602. The TXOP 608a begins at a time 722 and ends at a time 726. The transmitter A simultaneously transmits multiple channel reservation messages 610a in the frequency resources 604 and data 612a in the frequency resources 606 during the TXOP 608a.

The transmitter B may hear or detect the channel reservation message 610a of the transmitter A, but determines that backoff without transmission (e.g., yielding) is not required based on channel conditions or channel reservation information in the channel reservation message 610a. For example, the transmitter A's channel reservation messages 610a may indicate a transmission beam direction of the data 612a or a receiving node of the data 612a. The transmitter B may determine that the data 612a is transmitted in a direction different from an intended transmission beam direction of the transmitter B. Thus, the transmitter B may begin a TXOP 608b in the middle (e.g., at a time 724) of the transmitter A's TXOP 608a. The transmitter B simultaneously transmits multiple channel reservation messages 610b in the frequency resources 604 and data 612b in the frequency resources 606 during the TXOP 608b. The portion 710 corresponds to a duration in which both a portion of the data 612a of the transmitter A and a portion of the data 612b of the transmitter B are communicated over the frequency resources 606.

In an embodiment, the transmitter B may select a time to repeat the transmission of the channel reservation message 610b to increase the preamble detection probabilities at the transmitter A. For example, the transmitter B may obtain a reservation duration of the TXOP 608a from the channel reservation messages 610a and retransmits the channel reservation message 610b (e.g., shown as the channel reservation message $610b_{(2)}$) at a time 728 after the transmitter A's TXOP 608a ended.

To avoid potential collision when multiple transmit nodes or transmitters send repeated preamble or channel reservation messages at the same time after the end of the transmitter A's TXOP 608a (e.g., at time 726), each transmit node may apply timing randomization (e.g., similar to a random backoff) to determine a transmission time for transmitting a next repeated channel reservation message. For example, a transmitter C also started a TXOP before the end of the transmitter A's TXOP 608a and observed that the transmitter A has completed the TXOP 608a at the time 726. To avoid potential collision, both the transmitter B and the transmitter C may apply timing randomization to determine a transmission time for sending a next repeated channel reservation message after the time 726. The timing randomization may reduce the probability that the transmitter B and the transmitter C will transmit repeated channel reservation messages at the same times after the time 726.

A shown in the scenario 700, while the transmitter A has missed the preamble detection window of the first channel reservation message $610b_{(1)}$, the transmitter A can detect the repeated channel reservation message $610b_{(2)}$ from the transmitter B and refrain from accessing the shared spectrum 602. Thus, repeating the transmission of channel reservation messages during a TXOP can reduce deafness in preamble detection for asynchronous medium sharing.

FIG. 8A illustrates a channel reservation scheme 800 that reduces deafness in preamble detection for asynchronous medium sharing according to embodiments of the present disclosure. The scheme 800 is employed by transmitters such as the BSs 105 and UEs 115 to communicate over a shared spectrum 602 based on asynchronous medium sharing. The scheme 800 is similar to the scheme 600, but allows a transmitter to transmit different versions of channel reservation messages during a TXOP 806. For example, the transmitter may transmit a detailed channel reservation message 810 at the beginning of the TXOP 806 at a time 822 and subsequently transmit one or more shortened channel reservation messages 812 over the duration of the TXOP 806. The transmitter may transmit data 814 in the frequency resources 606 in concurrent with the detailed channel reservation message 810 and the shortened channel reservation messages 812 in the frequency resources 604.

FIG. 8B illustrates the detailed channel reservation message 810 according to embodiments of the present disclosure. FIG. 8C illustrates the shortened channel reservation message 812 according to embodiments of the present disclosure. The detailed channel reservation message 810 includes a preamble 830 and channel reservation information 832. The channel reservation information 832 may indicate a reservation duration, a destination node or a scheduled node, a beam direction, and/or any information associated with the transmission of the data 814. The shortened channel reservation message 812 includes a preamble 834. The preamble 830 and the preamble 834 may include different predetermined sequences to enable a monitoring node to differentiate between the detailed channel reservation message 810 and the shortened channel reservation messages 812.

For example, when a monitoring node detects a preamble 830, the monitoring node may proceed to decode the additional channel reservation information 832. The monitoring node may backoff according to the additional channel reservation information 832. When the monitoring node detects a preamble 834, the monitoring node may not proceed with further decoding and may backoff by a predetermined amount of time. Thus, the scheme 800 can reduce channel reservation processing overhead. While the shortened channel reservation message 812 is illustrated without any channel reservation information, in some embodiments, the shortened channel reservation message 812 may include a shortened version of the channel reservation information 832 in addition to the preamble 834. In addition, the transmitter may transmit the shortened channel reservation messages 812 uniformly distributed over the duration of the TXOP 806 or at selected transmission time, as described in greater detail herein.

Figure 9:
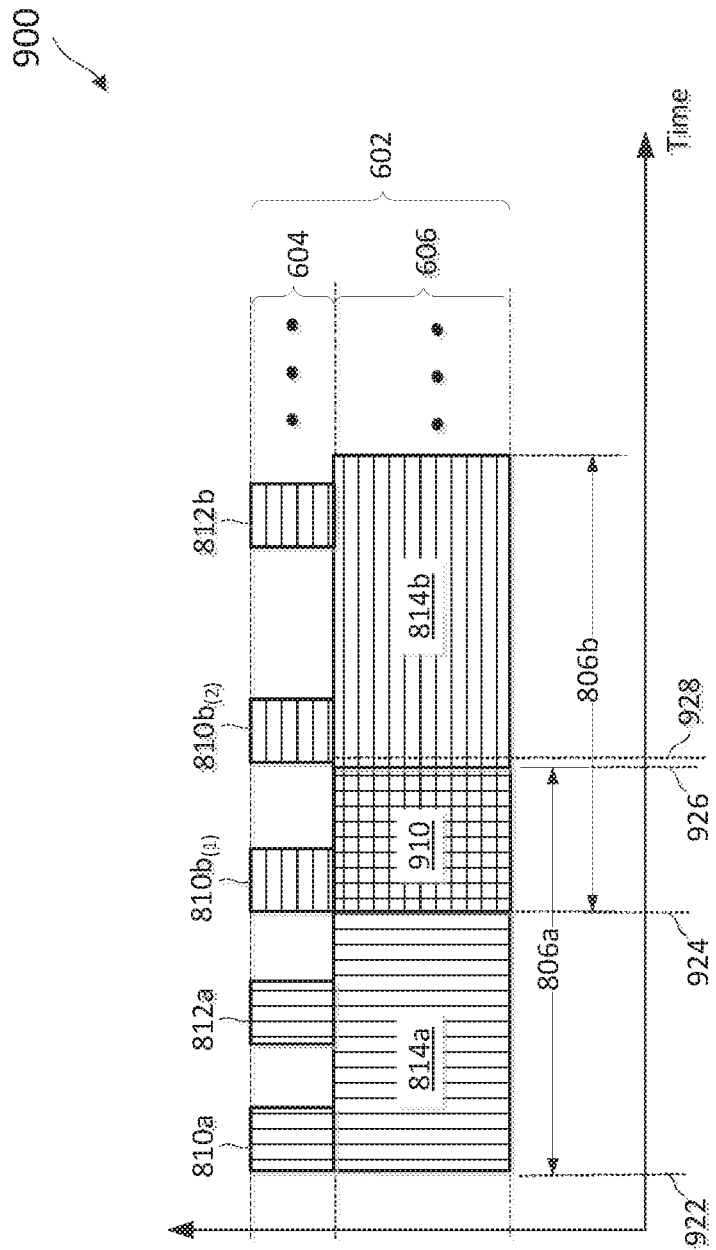
FIG. 9 illustrates an asynchronous medium sharing scenario according to embodiments of the present disclosure.

FIG. 9 illustrates an asynchronous medium sharing scenario 900 according to embodiments of the present disclosure. The scenario 900 illustrates a transmitter A (e.g., a BS 105 or a UE 115) of a transmitter-receiver pair and a transmitter B (e.g., a BS 105 or a UE 115) of another transmitter-receiver pair employing the channel reservation scheme 800 for asynchronous medium sharing. In the scenario 900, the transmitter A acquires a TXOP 806a in the shared spectrum 602. The TXOP 806a begins at a time 922 and ends at a time 926. The transmitter A transmits a detailed channel reservation message 810a at the time 922 and a shortened channel reservation message 812a during the TXOP 806a in the frequency resources 604. The transmitter A transmits data 814 in the frequency resources 606 in concurrent with the transmissions of the detailed channel reservation message 810a and the shortened channel reservation message 812a.

Similar to the scenario 700, the transmitter B may hear or detect the detailed channel reservation message 810a and/or the shortened channel reservation message 812a of the transmitter A, but determines that backoff without transmission is not required. Thus, the transmitter B may begin a TXOP 806b during (e.g., at a time 924) the transmitter A's TXOP 806a. The transmitter B may transmit a detailed channel reservation message $810b_{(1)}$ in the frequency resources 606 at the beginning of the TXOP 806b. The transmitter B may transmit data 814 in the frequency resources 606 in concurrent with the detailed channel reservation message 810b. The portion 910 corresponds to a duration in which both a portion of the data 814a of the transmitter A and a portion of the data 814b of the transmitter B are communicated over the frequency resources 606.

The transmitter B may select a time to repeat the transmission of the detailed channel reservation message 810b in the frequency resources 604 during the TXOP 806b to increase the preamble detection probabilities at the transmitter A. For example, the transmitter B may obtain a reservation duration of the TXOP 806a from the transmitter A's detailed channel reservation message 810a and retransmits the detailed channel reservation message 810b (e.g., shown as the detailed channel reservation message $810b_{(2)}$) at a time 928 after the transmitter A's TXOP 806a ended. The transmitter B may determine the time 928 by applying timing randomization to avoid potential collision with a repeated channel reservation message transmission of another transmit node as described in the scenario 700. Thus, while the transmitter A has missed the preamble detection window of the first detailed channel reservation message $810b_{(1)}$, the transmitter A can detect the detailed channel reservation message $810b_{(2)}$ and refrain from accessing the shared spectrum 602. Subsequently, the transmitter B may transmit shortened channel reservation messages 812b.

Figure 10:
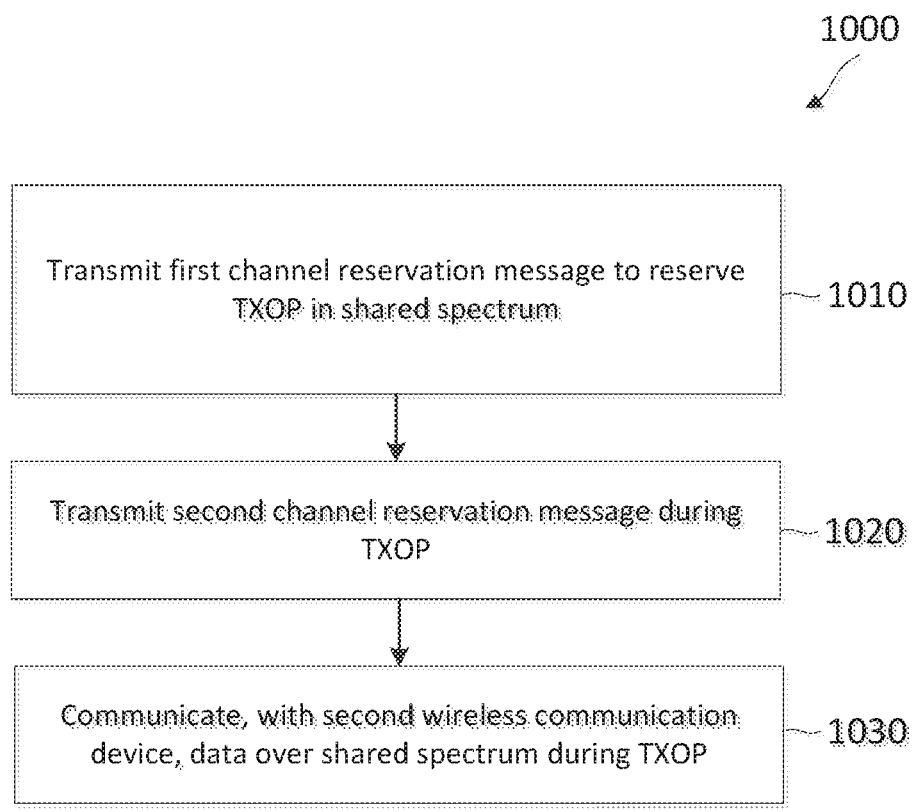
FIG. 10 is a flow diagram of a method of performing asynchronous medium sharing according to embodiments of the present disclosure.

FIG. 10 is a flow diagram of a method 1000 of performing asynchronous medium sharing according to embodiments of the present disclosure. Steps of the method 1000 can be executed by a computing device (e.g., a processor, processing circuit, and/or other suitable component) of a wireless communication device, such as the BSs 105 and 500 and the UEs 115 and 400. The method 1000 may employ similar mechanisms in the schemes 600 and 800 and the scenarios 700 and 900 described with respect to FIGS. 6, 8, 7, and 9, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes transmitting a first channel reservation message (e.g., the channel reservation messages 610 or the detailed channel reservation messages 810) to reserve a TXOP (e.g., the TXOPs 608 and 806) in a shared spectrum (e.g., the shared spectrum 602).

At step 1020, the method 1000 includes transmitting a second channel reservation message (e.g., the channel reservation message 610, the detailed channel reservation message 810, or the shortened channel reservation messages 812) during the TXOP.

At step 1030, the method 1000 includes communicating, with a second wireless communication device, data (e.g., the data 612 and 814) over the shared spectrum during the TXOP.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a method of wireless communication, including transmitting, by a first wireless communication device, a first channel reservation message to reserve a transmission opportunity (TXOP) in a shared spectrum; transmitting, by the first wireless communication device, a second channel reservation message during the TXOP; and communicating, by the first wireless communication device with a second wireless communication device, data over the shared spectrum during the TXOP.

The method further includes wherein the first channel reservation message and the second channel reservation message include different channel reservation information. The method further includes wherein the first channel reservation message and the second channel reservation message include different predetermined sequences. The method further includes wherein the first channel reservation message further includes reservation information indicating at least a reservation duration. The method further includes wherein the transmitting the first channel reservation message includes transmitting the first channel reservation message at a beginning of the TXOP. The method further includes wherein the transmitting the first channel reservation message includes transmitting the first channel reservation message in a first frequency resource within the shared spectrum, wherein the transmitting the second channel reservation message includes transmitting the second channel reservation message in the first frequency resource, wherein the communicating the data includes transmitting the data in a second frequency resource within the shared spectrum, and wherein the first frequency resource and the second frequency resource are different frequency resources. The method further includes determining, by the first wireless communication device, a transmission time for the transmitting of the second channel reservation message. The method further includes wherein the determining includes determining the transmission time such that at least the first channel reservation message and the second channel reservation message are uniformly distributed over a duration of the TXOP. The method further includes detecting, by the first wireless communication device, another reservation for the shared spectrum by a third wireless communication device, wherein the determining is based on the detecting. The method further includes wherein the another reservation indicates a duration of the another reservation, and wherein the determining is further based on the duration of the another reservation. The method further includes wherein the determining is further based on a random backoff duration. The method further includes wherein each of the first channel reservation message and the second channel reservation message includes transmission timing information associated with the data.

Embodiments of the present disclosure include an apparatus including a transceiver configured to transmit a first channel reservation message to reserve a transmission opportunity (TXOP) in a shared spectrum; transmit a second channel reservation message during the TXOP; and communicate, with a second wireless communication device, data over the shared spectrum during the TXOP.

The apparatus further includes wherein the first channel reservation message and the second channel reservation message include different channel reservation information. The apparatus further includes wherein the first channel reservation message and the second channel reservation message include different predetermined sequences. The apparatus further includes wherein the first channel reservation message further includes reservation information indicating at least a reservation duration. The apparatus further includes wherein the transceiver is further configured to transmit the first channel reservation message by transmitting the first channel reservation message at a beginning of the TXOP. The apparatus further includes wherein the transceiver is further configured to transmit the first channel reservation message by transmitting the first channel reservation message in a first frequency resource within the shared spectrum; transmit the second channel reservation message by transmitting the second channel reservation message in the first frequency resource; and communicating the data by transmitting the data in a second frequency resource within the shared spectrum, and wherein the first frequency resource and the second frequency resource are different frequency resources. The apparatus further includes a processor configured to determine a transmission time for the transmission of the second channel reservation message. The apparatus further includes wherein the processor is further configured to determine the transmission time by determining the transmission time such that at least the first channel reservation message and the second channel reservation message are uniformly distributed over a duration of the TXOP. The apparatus further includes wherein the processor is further configured to detect another reservation for the shared spectrum by a third wireless communication device; and determine the transmission time further based on the another reservation. The apparatus further includes wherein the another reservation indicates a duration of the another reservation, and wherein the processor is further configured to determine the transmission time further based on the duration of the another reservation. The apparatus further includes wherein the processor is further configured to determine the transmission time further based on a random backoff duration. The apparatus further includes wherein each of the first channel reservation message and the second channel reservation message includes transmission timing information associated with the data.

Embodiments of the present disclosure include a computer-readable medium having program code recorded thereon, the program code including code for causing a first wireless communication device to transmit a first channel reservation message to reserve a transmission opportunity (TXOP) in a shared spectrum; code for causing the first wireless communication device to transmit a second channel reservation message during the TXOP; and code for causing the first wireless communication device to communicate, with a second wireless communication device, data over the shared spectrum during the TXOP.

The computer-readable medium further includes wherein the first channel reservation message and the second channel reservation message include different channel reservation information. The computer-readable medium further includes wherein the first channel reservation message and the second channel reservation message include different predetermined sequences. The computer-readable medium further includes wherein the first channel reservation message further includes reservation information indicating at least a reservation duration. The computer-readable medium further includes wherein the code for causing the first wireless communication device to transmit the first channel reservation message is further configured to transmit the first channel reservation message at a beginning of the TXOP. The computer-readable medium further includes wherein the code for causing the first wireless communication device to transmit the first channel reservation message is further configured to transmit the first channel reservation message in a first frequency resource within the shared spectrum, wherein the code for causing the first wireless communication device to transmit the second channel reservation message is further configured to transmit the second channel reservation message in the first frequency resource, wherein the code for causing the first wireless communication device to communicate the data is further configured to transmit the data in a second frequency resource within the shared spectrum, and wherein the first frequency resource and the second frequency resource are different frequency resources. The computer-readable medium further includes code for causing the first wireless communication device to determine a transmission time for the transmission of the second channel reservation message. The computer-readable medium further includes wherein the code for causing the first wireless communication device to determine the transmission time is further configured to determine the transmission time such that at least the first channel reservation message and the second channel reservation message are uniformly distributed over a duration of the TXOP. The computer-readable medium further includes code for causing the first wireless communication device to detect another reservation for the shared spectrum by a third wireless communication device, wherein the code for causing the first wireless communication device to determine the transmission time is further configured to determine the transmission time based on the another reservation. The computer-readable medium further includes wherein the another reservation indicates a duration of the another reservation, and wherein the code for causing the first wireless communication device to determine the transmission time is further configured to determine the transmission time based on the duration of the another reservation. The computer-readable medium further includes wherein the code for causing the first wireless communication device to determine the transmission time is further configured to determine the transmission time based on a random backoff duration. The computer-readable medium further includes wherein each of the first channel reservation message and the second channel reservation message includes transmission timing information associated with the data.

Embodiments of the present disclosure include an apparatus including means for transmitting a first channel reservation message to reserve a transmission opportunity (TXOP) in a shared spectrum; means for transmitting a second channel reservation message during the TXOP; and means for communicating, with a second wireless communication device, data over the shared spectrum during the TXOP.

The apparatus further includes wherein the first channel reservation message and the second channel reservation message include different channel reservation information. The apparatus further includes wherein the first channel reservation message and the second channel reservation message include different predetermined sequences. The apparatus further includes wherein the first channel reservation message further includes reservation information indicating at least a reservation duration. The apparatus further includes wherein the means for transmitting the first channel reservation message is further configured to transmit the first channel reservation message at a beginning of the TXOP. The apparatus further includes wherein the means for transmitting the first channel reservation message is further configured to transmit the first channel reservation message in a first frequency resource within the shared spectrum, wherein the means for transmitting the second channel reservation message is further configured to transmit the second channel reservation message in the first frequency resource, and wherein the means for communicating the data is further configured to transmit the data in a second frequency resource within the shared spectrum, and wherein the first frequency resource and the second frequency resource are different frequency resources. The apparatus further includes means for determining a transmission time for the transmission of the second channel reservation message. The apparatus further includes wherein the means for determining the transmission time is further configured to determine the transmission time such that at least the first channel reservation message and the second channel reservation message are uniformly distributed over a duration of the TXOP. The apparatus further includes means for detecting another reservation for the shared spectrum by a third wireless communication device, and wherein the means for determining the transmission time is further configured to determine the transmission time based on the another reservation. The apparatus further includes wherein the another reservation indicates a duration of the another reservation, and wherein the means for determining the transmission time is further configured to determine the transmission time based on the duration of the another reservation. The apparatus further includes wherein the means for determining the transmission time is further configured to determine the transmission time based on a random backoff duration. The apparatus further includes wherein each of the first channel reservation message and the second channel reservation message includes transmission timing information associated with the data.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
transmitting, by a first wireless communication device, a first channel reservation message including a reservation for a transmission opportunity (TXOP) in a shared spectrum for communicating data, the first channel reservation message including channel reservation information;
communicating, by the first wireless communication device with a second wireless communication device, the data over the shared spectrum during the TXOP; and
transmitting, by the first wireless communication device, a second channel reservation message during the TXOP concurrent with communicating the data, the second channel reservation message repeating the reservation for the TXOP for communicating the data, the second channel reservation message including a reduced set of the channel reservation information that is less than the channel reservation information in the first channel reservation message.

2. The method of claim 1, wherein the first channel reservation message includes first reservation information and a first preamble sequence indicating the reservation, wherein the second channel reservation message includes a second preamble sequence indicating the reservation without the first reservation information, and wherein the first reservation information includes at least one of a reservation duration or a beam direction.

3. The method of claim 1, wherein the second channel reservation message includes a different preamble sequence than the first channel reservation message for repeating the reservation.

4. The method of claim 3, wherein the channel reservation information indicates at least a reservation duration.

5. The method of claim 4, wherein the transmitting the first channel reservation message includes transmitting the first channel reservation message at a beginning of the TXOP.

6. The method of claim 1, wherein the transmitting the first channel reservation message includes transmitting the first channel reservation message in a first frequency resource within the shared spectrum, wherein the transmitting the second channel reservation message includes transmitting the second channel reservation message in the first frequency resource, wherein the communicating the data includes transmitting the data in a second frequency resource within the shared spectrum, and wherein the first frequency resource and the second frequency resource are different frequency resources.

7. The method of claim 1, further comprising determining, by the first wireless communication device, a transmission time for the transmitting of the second channel reservation message such that at least the first channel reservation message and the second channel reservation message are uniformly distributed over a duration of the TXOP.

8. The method of claim 1, further comprising:
   detecting, by the first wireless communication device, another reservation for the shared spectrum by a third wireless communication device; and
   determining, by the first wireless communication device, a transmission time for the transmitting of the second channel reservation message based on the another reservation.

9. The method of claim 8, wherein the another reservation indicates a duration of the another reservation, and wherein the determining is further based on at least one of the duration of the another reservation or a random backoff duration.

10. The method of claim 1, wherein each of the first channel reservation message and the second channel reservation message includes transmission timing information associated with the data.

11. An apparatus comprising:
   a transceiver configured to:
     transmit a first channel reservation message including a reservation for a transmission opportunity (TXOP) in a shared spectrum for communicating data, the first channel reservation message including channel reservation information;
     communicate, with a second wireless communication device, the data over the shared spectrum during the TXOP; and
     transmit a second channel reservation message during the TXOP concurrent with communicating the data, the second channel reservation message repeating the reservation for the TXOP for communicating the data, the second channel reservation message including a reduced set of the channel reservation information that is less than the channel reservation information in the first channel reservation message.

12. The apparatus of claim 11, wherein the first channel reservation message includes first reservation information and a first preamble sequence indicating the reservation, wherein the second channel reservation message includes a second preamble sequence indicating the reservation without the first reservation information, and wherein the first reservation information includes at least one of a reservation duration or a beam direction.

13. The apparatus of claim 11, wherein the second channel reservation message includes a different preamble sequence than the first channel reservation message for repeating the reservation.

14. The apparatus of claim 13, wherein the channel reservation information indicates at least a reservation duration.

15. The apparatus of claim 14, wherein the transceiver is further configured to transmit the first channel reservation message by transmitting the first channel reservation message at a beginning of the TXOP.

16. The apparatus of claim 11, wherein the transceiver is further configured to:
   transmit the first channel reservation message by transmitting the first channel reservation message in a first frequency resource within the shared spectrum;
   transmit the second channel reservation message by transmitting the second channel reservation message in the first frequency resource; and
   communicating the data by transmitting the data in a second frequency resource within the shared spectrum, and
   wherein the first frequency resource and the second frequency resource are different frequency resources.

17. The apparatus of claim 11, further comprising a processor configured to determine a transmission time for the transmission of the second channel reservation message such that at least the first channel reservation message and the second channel reservation message are uniformly distributed over a duration of the TXOP.

18. The apparatus of claim 11, further comprising a processor is further configured to:
   detect another reservation for the shared spectrum by a third wireless communication device; and
   determine a transmission time for the transmission of the second channel reservation message based on the another reservation.

19. The apparatus of claim 18, wherein the another reservation indicates a duration of the another reservation, and wherein the processor is further configured to determine the transmission time further based on at least one of the duration of the another reservation or a random backoff duration.

20. The apparatus of claim 11, wherein each of the first channel reservation message and the second channel reservation message includes transmission timing information associated with the data.

21. A non-transitory computer-readable medium having computer executable code recorded thereon, the computer executable code, when executed by one or more processors of a first wireless communication device causes the first wireless communication device to perform operations, comprising:
   transmitting a first channel reservation message including a reservation for a transmission opportunity (TXOP) in a shared spectrum for communicating data, the first channel reservation message including channel reservation information;
   communicating, with a second wireless communication device, the data over the shared spectrum during the TXOP; and
   transmitting a second channel reservation message during the TXOP concurrent with communicating the data, the second channel reservation message repeating the reservation for the TXOP for communicating the data, the second channel reservation message including a reduced set of the channel reservation information that is less than the channel reservation information in the first channel reservation message.

22. The non-transitory computer-readable medium of claim 21, wherein the first channel reservation message includes first reservation information and a first preamble sequence indicating the reservation, wherein the second channel reservation message includes a second preamble sequence indicating the reservation without the first reservation information, and wherein the first reservation information includes at least one of a reservation duration or a beam direction.

23. The non-transitory computer-readable medium of claim 21, wherein the second channel reservation message includes a different preamble sequence than the first channel reservation message for repeating the reservation.

24. The non-transitory computer-readable medium of claim 23, wherein the channel reservation information indicates at least a reservation duration.

25. The non-transitory computer-readable medium of claim 24, wherein the transmitting the first channel reservation message includes transmitting the first channel reservation message at a beginning of the TXOP.

26. The non-transitory computer-readable medium of claim 21, wherein the transmitting the first channel reservation message includes transmitting the first channel reservation message in a first frequency resource within the shared spectrum, wherein the transmitting the second channel reservation message includes transmitting the second channel reservation message in the first frequency resource, wherein the communicating the data includes transmitting the data in a second frequency resource within the shared spectrum, and wherein the first frequency resource and the second frequency resource are different frequency resources.

27. The non-transitory computer-readable medium of claim 21, wherein the operations further comprises determining a transmission time for the transmission of the second channel reservation message such that at least the first channel reservation message and the second channel reservation message are uniformly distributed over a duration of the TXOP.

28. The non-transitory computer-readable medium of claim 21, wherein the operations further comprises:
  detecting another reservation for the shared spectrum by a third wireless communication device; and
  determining a transmission time for the transmission of the second channel reservation message based on the another reservation.

29. The non-transitory computer-readable medium of claim 28, wherein the another reservation indicates a duration of the another reservation, and wherein the determining the transmission time is based on at least one of the duration of the another reservation or a random backoff duration.

30. The non-transitory computer-readable medium of claim 21, wherein each of the first channel reservation message and the second channel reservation message includes transmission timing information associated with the data.

* * * * *